(12) United States Patent
Rodgers

(10) Patent No.: US 8,309,225 B2
(45) Date of Patent: Nov. 13, 2012

(54) THERMALLY CONDUCTIVE STRUCTURAL COMPOSITE MATERIAL AND METHOD

(75) Inventor: Steven R. Rodgers, West Jordan, UT (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 475 days.

(21) Appl. No.: 12/146,178

(22) Filed: Jun. 25, 2008

(65) Prior Publication Data
US 2009/0004393 A1 Jan. 1, 2009

Related U.S. Application Data

(60) Provisional application No. 60/937,979, filed on Jun. 29, 2007.

(51) Int. Cl.
*B32B 9/00* (2006.01)
(52) U.S. Cl. ........................................ 428/408
(58) Field of Classification Search .................. None
See application file for complete search history.

(56) References Cited

U.S. PATENT DOCUMENTS

| | | | |
|---|---|---|---|
| 3,728,423 A | 4/1973 | Shaffer | |
| 4,100,322 A | 7/1978 | Seibold et al. | |
| 4,215,161 A | 7/1980 | Seibold et al. | |
| 4,265,968 A | 5/1981 | Prewo | |
| H1332 H | 7/1994 | Deakyne et al. | |
| 5,418,063 A * | 5/1995 | Booth | 428/408 |
| 5,520,976 A | 5/1996 | Giannetti et al. | |
| 5,863,467 A | 1/1999 | Mariner et al. | |
| 6,048,919 A | 4/2000 | McCullough | |
| 6,251,978 B1 | 6/2001 | McCullough | |
| 6,465,100 B1 * | 10/2002 | Johnson et al. | 428/408 |
| 6,506,482 B1 | 1/2003 | Burton et al. | |
| 6,521,296 B1 * | 2/2003 | Seal et al. | 427/294 |
| 6,730,731 B2 | 5/2004 | Tobita et al. | |
| 6,756,112 B1 * | 6/2004 | Wapner et al. | 428/293.4 |
| 6,835,347 B2 | 12/2004 | McCullough et al. | |
| 6,837,306 B2 | 1/2005 | Houle et al. | |
| 7,276,203 B2 | 10/2007 | Sommer et al. | |
| 2006/0130998 A1 | 6/2006 | Ludtke | |

FOREIGN PATENT DOCUMENTS

| | | |
|---|---|---|
| JP | 06-320536 | 11/1994 |
| JP | 07-144371 | 6/1995 |
| JP | 10-231372 | 9/1998 |
| JP | 16-131538 | 4/2004 |
| WO | WO 2007/011313 | 1/2007 |

OTHER PUBLICATIONS

Rak, Z.S. et al., Cf/SIC Composites by a noval manufacturing method, Dec. 2000. 21 pages.

* cited by examiner

*Primary Examiner* — Camie Thompson
(74) *Attorney, Agent, or Firm* — Thorpe North & Western LLP

(57) ABSTRACT

A heat dissipative composite material including a carbon fiber lay-up having a resin pyrolized to form a graphitic carbon laminate structure. A structural resin fills voids in the graphitic carbon laminate structure and provides strength to the graphitic carbon laminate structure.

32 Claims, 3 Drawing Sheets

THERMALLY CONDUCTIVE STRUCTURAL COMPOSITE MATERIAL AND METHOD

PRIORITY CLAIM

Benefit is claimed of U.S. Provisional Patent Application Ser. No. 60/937,979, filed Jun. 29, 2007 which is herein incorporated by reference in its entirety for all purposes.

BACKGROUND OF THE INVENTION

1. Field of the Invention

The present invention relates generally to composite materials and more particularly to composite materials having thermal conductive properties.

2. Related Art

Most electronic devices have enclosures such as boxes that cover and protect the electronic circuitry of the device. Unfortunately, these boxes also trap thermal energy or heat generated by the electronic circuitry during operation of the device. This heat can damage the electronic devices if allowed to build up within the box or housing. Consequently, many boxes for electronic devices are made from thermally conductive materials such as aluminum or other conductive metals. These thermally conductive enclosures allow the heat from the electronic device to dissipate by conduction before the heat builds to a critical temperature.

While metal boxes satisfy the thermal conductivity and strength requirements for housing electronic devices, they often add undesirable weight to the device. This weight can limit the usefulness of the device in some applications. For example, aircraft have many electronic devices that are enclosed in metal thermally conductive boxes. Unfortunately, metal boxes can add significant weight to the aircraft. It will be appreciated that the heavier an aircraft is, the more fuel required to lift the aircraft. Thus, the weight of the boxes can reduce the ability of the aircraft to carry additional cargo, or require additional fuel for the aircraft to fly.

One common alternative to heavier metallic components is to use lighter weight composite materials such as carbon fiber reinforced plastic, carbon composites, and the like. Such composite materials usually consist of fiber reinforcements, such as a carbon or graphite fibers, that are infused with a polymeric resin matrix, such as a phenolic resin, a polyimide resin, and the like.

These composite materials are attractive for many applications because they have relatively low weight and high strength properties which are desirable characteristics for structural components such as electronic enclosures. Unfortunately, while some carbon composite materials have been developed that have high thermal conductivity, and high ablative recession properties, these materials also lose strength in elevated temperature environments or can become brittle from repeated heating over time which can result in thermal stress cracking problems. Thus, use of these materials in forming electronic device enclosures has not been practical.

SUMMARY OF THE INVENTION

The inventor of the present invention has recognized that it would be advantageous to develop a composite material that has relatively low weight, relatively high strength, relatively high ablative recession, and relatively high thermal conductivity. The inventor has also recognized that it would be advantageous to develop a method for forming a structure made from a composite material having a relatively low weight, relatively high strength, relatively high ablative recession, and relatively high thermal conductivity.

Accordingly, the invention provides a heat dissipative composite material. The composite material can have a carbon fiber lay-up including a thermally conductive carbon fiber forming a substantially continuous thermally conductive path along a z-axis of the carbon fiber layup. A pyrolizable resin can be impregnated into the thermally conductive carbon fiber. The pyrolizable resin can be pyrolized in the carbon fiber lay up to a graphitic carbon state to form a graphitic carbon laminate structure with the carbon fiber. A structural resin can be infused into subsequent voids in the graphitic carbon laminate structure formed by pyrolization of the pyrolizable resin. The structural resin can be cured with the graphitic carbon laminate structure to provide strength to the graphitic carbon laminate structure.

The present invention also provides for a composite article having a pyrolized carbon-graphitic-carbon laminate structure having voids disposed therein. In a secondary operation a structural resin can substantially fill voids in the laminate structure to provide strength to the laminate structure. The pyrolized carbon-graphitic-carbon laminate structure can provide a z-axis thermal conductivity of the composite article of at least 10 W/mK.

The present invention also provides for a method for forming a thermally conductive, heat dissipative composite structure including forming a carbon fiber lay up from a pitch-based carbon fiber having a thermal conductivity greater than 20 W/mK. A pyrolizable resin can be impregnated into the carbon fiber lay up. The pyrolizable resin impregnated carbon fiber lay-up can be heated to greater than approximately 1800° F. to pyrolize the resin into graphitic carbon and to form a carbon graphitic-carbon laminate structure. A structural resin can be infused into the carbon graphitic-carbon laminate structure to provide strength to the laminate structure. The structural resin can have a resin toughness greater than approximately 60 J/m². The structural resin infused laminate structure can be cured to form the heat dissipative composite material having a thermal conductivity of greater than approximately 10 W/mK.

Additional features and advantages of the invention will be apparent from the detailed description which follows, taken in conjunction with the accompanying drawings, which together illustrate, by way of example, features of the invention.

DETAILED DESCRIPTION

Figure 1:
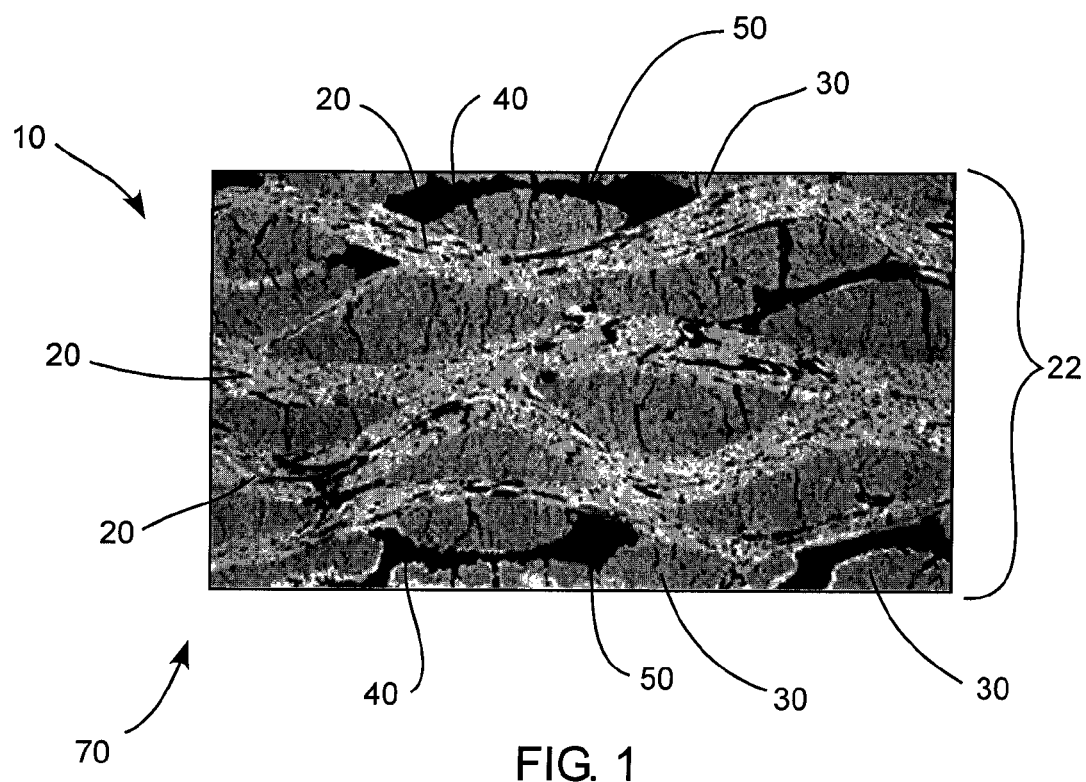
FIG. 1 is microscopic pictorial view of a heat dissipative composite material shown with a graphite carbon fiber laminate structure and a structural resin filling voids between fibers of the laminate structure.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

The embodiments of the present invention described herein generally provide for a heat dissipative composite material having low weight, high strength, high thermal conductivity, that does not contribute substantially to thermal ablation. The material can be formed by a carbon fiber lay up impregnated with a pyrolizable resin. The carbon fiber lay up can include a pitch based carbon or graphite fiber having a thermal conductivity greater than approximately 20 W/mK. The carbon fiber lay up and pyrolizable resin can be heated to a temperature greater than approximately 1800° F. in order to pyrolize or burn the pyrolizable resin to a graphitic carbon ash. The carbon fiber lay up and graphitic carbon ash can form a carbon/graphitic-carbon laminate structure. Approximately 35% of the carbon/graphitic-carbon laminate structure can be voids formed where the pyrolized resin burned away, or was reduced to graphitic carbon ash, during the pyrolization process. A structural resin can be infused into and cured in the carbon/graphitic-carbon laminate structure to fill the voids and form the heat dissipative composite material. The structural resin infused, carbon/graphitic-carbon laminate structure forming the heat dissipative composite material can have a z-axis thermal conductivity of greater than approximately 10 W/mK.

As illustrated in FIG. 1, a heat dissipative composite material, indicated generally at 10, in accordance with the present invention is shown for use in forming composite articles with low weight, high strength, and high thermal conductivity, and that does not contribute substantially to thermal ablation, such as electronic device enclosures and the like. The thermally conductive composite material 10 can include carbon fibers 20, a graphitic carbon formed from a pyrolized resin 30 impregnated in the carbon fibers 20, and a plurality of voids 40 in a graphitic carbon laminate structure 70 filled with a cured structural resin 50.

The carbon fibers 20 can extend throughout the composite material forming a carbon fiber lay-up, shown generally at 22. The carbon fibers 20 can be an oriented pattern of carbon fiber windings, a random pattern of randomly oriented chopped fibers, a pattern of substantially similarly oriented fibers, a stack of fiber plies with the fibers of each ply oriented at offsetting angles from one another, a fabric woven from a plurality of carbon fibers, or combinations of these fiber structures. Each of these fiber patterns can be formed by composite fiber lay-up techniques and methods known in the art.

Thus, in one aspect, the carbon fibers 20 can be a substantially continuous fiber that can be wound about a mandrel to form a carbon fiber winding. In another aspect, the carbon fiber can include chopped fibers randomly oriented and pressed into a mat. In yet another aspect, the carbon fiber can be a woven fabric. Several mats can be stacked to form the lay-up. Other forms of carbon fiber, such as oriented fiber mats, fiber plies, and the like can also be used to form the lay-up.

The carbon fibers 20 can have a thermal conductivity greater than approximately 20 W/mK in a z-axis direction, or thickness, with respect to the fiber lay up orientation. In this way, the carbon fibers can provide a substantially continuous thermally conductive path along the z-axis of the carbon fiber lay up. Additionally, the carbon fibers 20 can be derived from a heat treated mesophase petroleum pitch that is carbonic or graphitic after heat treatment at temperatures exceeding 2200° degrees Celsius. Such carbon or graphite fibers are commonly referred to as "pitch-based fibers," and tend to have high Young's modulus and exhibit high thermal conductivities that range from about 20 W/mK to more than 600 W/mK.

It will be appreciated that carbon fibers can be derived from other sources such as polyacrylonitrile, commonly referred to as "PAN-based fibers," that are turbostratic. Such turbostratic PAN-based fibers tend to have high tensile strength, but are less thermally conductive than pitch-based fibers. PAN-based fibers exhibit thermal conductivity in the 5-15 W/mK range, and are commonly used in applications requiring the carbon composite material to have high heat insulative properties such as rocket nozzle liners, heat shields, leading edges, and control surfaces.

In contrast, it is desirable for the carbon fibers 20 of the embodiments of the present invention described herein to have high thermal conductivity so as to rapidly dissipate heat. In this way, when pitch-based fibers are used in heat transmissive applications, the fibers can sufficiently conduct heat away from the heat source so as to protect sensitive environments or equipment near the heat source. Thus, when pitch-based fibers are used to form enclosures for electronic devices, the pitch-based carbon fibers can provide sufficient thermal conductivity to conduct heat away from electronic circuitry contained within the enclosure so as to protect the circuitry from heat damage.

The graphitic-carbon 30 can be disposed between the carbon fibers 20 and can at least partially fill voids or spaces formed between the carbon fibers. The graphitic carbon 30 can be formed by impregnating a pyrolizable resin 60 (FIG. 3*b*) into the carbon fiber lay-up and then pyrolizing or heating the resin to burn the resin until it turns to graphitic carbon ash or char. In one aspect, the pyrolizable resin 60 can be slowly heated in an inert atmosphere to a temperature greater than approximately 1800° F. to form the graphitic-carbon 30 and to subsequently create voids in the resulting graphitic carbon laminate structure.

It has been found that temperatures over 1800° F. produce a graphitic carbon laminate structure having a relatively higher thermal conductivity than lower temperatures which are often used to form carbon composite materials that are commonly used in heat insulative applications. The lower temperatures tend to produce a less dense char that has relatively higher ablation performance and decreased thermal conductivity which are desirable for heat insulative applications such as rocket nozzle liners, heat shields, and the like. In contrast, the higher temperatures produce a relatively denser char that has results in a higher thermal conductivity which is useful in heat transmissive applications such as enclosures for electronic devices. After the pyrolization process, the graphitic carbon char can be chemically bonded or mechanically adhered to the carbon fibers 20.

The pyrolizable resin 60 (FIG. 3*b*) can be a phenolic resin, a phenol formaldehyde resin, phenol-acetaldehyde, phenol-furfural, M-cresolformaldehyde, resorcinal-formaldehyde, melamine-formaldehyde, or combinations of these resins. Additionally, the pyrolizable resin 60 can be a cyanate ester, a bisphenol cyanate ester, a novalac cyanate ester, or combinations of these resins. The pyrolizable resin 60 can be impregnated into the carbon fiber lay-up 20 such that the carbon fibers 20 are wetted by the resin and spaces between the carbon fibers can be filled with the resin. The carbon fiber lay-up 22 and pyrolizable resin 60 can then be pyrolized, or heated to burn the pyrolizable resin to form the graphitic carbon 30 disposed between the carbon fibers 20. Together the pyrolized graphitic carbon 30 and carbon fibers 20 can form the graphitic carbon laminate structure 70.

The pyrolized composite material 10 can also include a plurality of voids 40 dispersed throughout the laminate structure 70. In one aspect the voids 40 can comprise approximately 35% of the laminate structure. It will be appreciated that the un-pyrolized resin can fill a larger spatial volume than the resultant graphitic carbon after pyrolization. Thus, the voids are also formed by the pyrolization process in that the resin is burned out of the spaces between the fibers leaving the graphitic carbon char 30 and empty space or void 40 between the carbon fibers 20.

In one aspect, the density of the graphitic carbon laminate structure can provide a z-axis thermal conductivity of greater than 10 W/mK. In another aspect, the density of the graphitic carbon laminate structure can provide a z-axis thermal conductivity of greater than 20 W/mK.

The structural resin 50 is a different resin than the pyrolizable resin 60 (FIG. 3b) and can include a structural epoxy, an epoxy novalac, a polycarbonate resin, a polycarbonate-polyester blend resin, a polyester resin, a glycidyl ether epoxy, a diglycidyl ether epoxy, a tridiglycidyl ether epoxy, a diglycerol, mannitol, a silicone polymer resin, a melamine resin, a heterocyclic resin, a polyamide resin, or combinations of these resins. Additionally, the structural resin 50 can include a thermoplastic resin, an olefin resin, a cyclic olefin, a dicyclopentadienes (DCPD), or combinations of these resins. The structural resin 50 can fill the voids 40 and provide additional strength to the laminate structure 70. In one aspect, the structural resin can have a resin toughness ($G_{IC}$) greater than approximately 60 J/m$^2$.

The structural resin 50 can be injected or infused by a vacuum process into the voids 40 in the laminate structure 70 after pyrolysis. The graphitic carbon laminate structure 70 filled with the structural resin 50 can be cured together to form the heat dissipative composite material 10.

Advantageously, the structural resin 50 can have a slight to minimal effect on the thermal conductivity of the heat dissipative composite material 10. Thus, in one aspect, the heat dissipative composite material 10 formed by the graphitic-carbon laminate structure 70 and cured structural resin 50 can have a z-axis, or thickness, thermal conductivity of at least 10 W/mK.

It will be appreciated that Carbon-Carbon laminates known in the art are relatively highly thermally conductive, and structural resins known in the art are relatively strong. Unfortunately, C—C composite materials, as known in the art, are too brittle to use in many applications requiring relatively higher strength materials. Similarly, structural resins known in the art not thermally conductive enough for high temperature applications. Thus, advantageously, the heat dissipative carbon/graphitic-carbon composite material of the present invention realizes the advantages of both the relatively high thermal conductivity properties of C—C laminate structures, and the relatively high strength properties of Carbon Fiber/Epoxy laminate structures.

Additionally, the structural resin 50 does not contribute substantially to thermal ablation. It will be appreciated that in many heat insulative applications it is desirable to have a structural resin that ablates to form an insulative char layer within the composite structure. This insulative char layer further inhibits thermal conductivity of the composite material. Unfortunately, many of the structural resins that form this insulative char layer during ablation also have reduced strength characteristics. Thus, strength is traded for insulation.

In contrast, the structural resin 50 used in the embodiments of the present invention described herein does not need to contribute substantially to thermal ablation. Advantageously, this allows use of a resin having relatively higher strength properties. In this way, the structural resin can be a thermoplastic resin, an olefin resin, a cyclic olefin, a dicyclopentadienes (DCPD) which have relatively higher resin toughnesses ($G_{IC}$) greater than approximately 60 μm$^2$, and may even exhibit some thermal conductivity.

Figure 2:
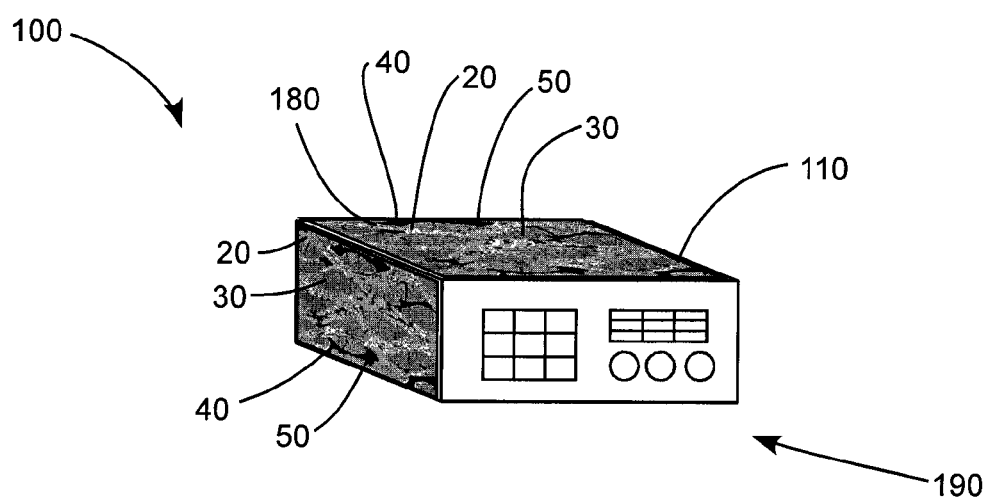
FIG. 2 is a schematic perspective view of a thermally conductive and heat dissipative composite article made from the heat dissipative composite material shown in FIG. 1. Figure not to scale.

Turning to FIG. 2, a thermally conductive composite article, indicated generally at 100, in accordance with the present invention is shown in use as an electronic device enclosure. The thermally conductive composite article 100 can include a thermally conductive composite material 110, similar in many respects to the thermally conductive composite material 10 described above and shown in FIG. 1. The thermally conductive composite material 110 can include a carbon fiber 20, a graphitic-carbon char formed from a pyrolized resin 30, and a plurality of voids 40 filled with a structural resin 50.

Additionally, the thermally conductive composite material 110 can be formed into the shape of an enclosure 180 for an electronic device, shown generally at 190. The enclosure 180 can be formed in a variety of shapes to enclose a variety of electronic devices. For example, in one aspect, the enclosure 180 can be generally quadrangular in shape, and can be sized and shaped to enclose a computer, such as a personal computer. As another example, the enclosure can have an arcuate shape coincident to the curvature of an airplane hull, and can be sized to contain electronic equipment commonly found on an airplane such as navigational computers, communication equipment, and the like. Advantageously, the thermally conductive composite article 100 can be relatively lighter than thermally conductive enclosures made from thermally conductive metallic materials.

Figure 3A:
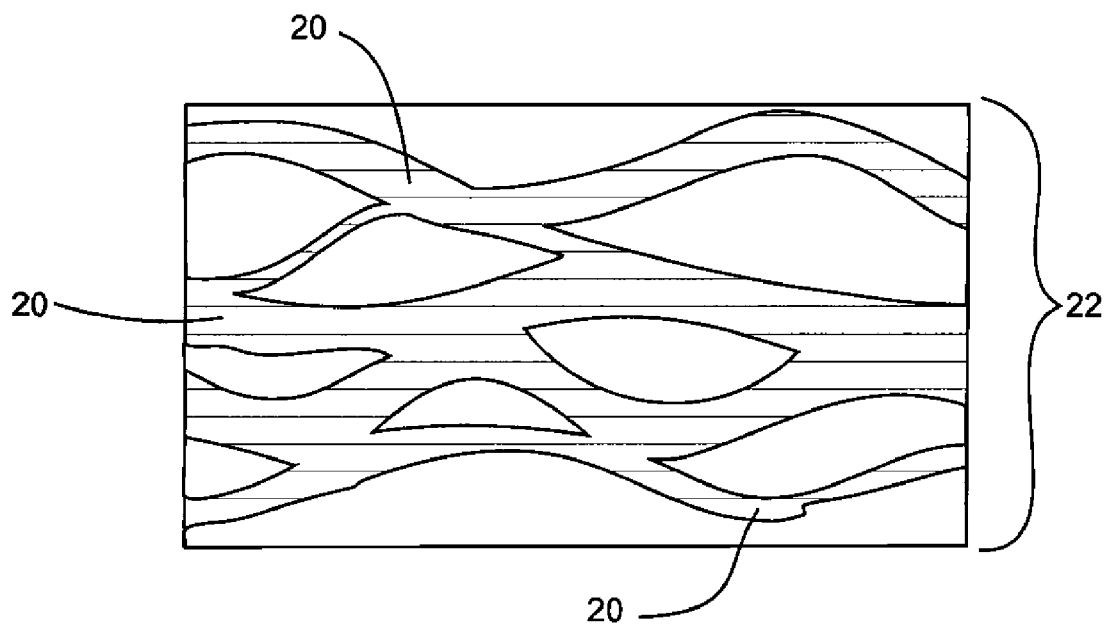
FIGS. 3a-3d illustrate a method for making a thermally conductive and heat dissipative material.
Figure 3B:
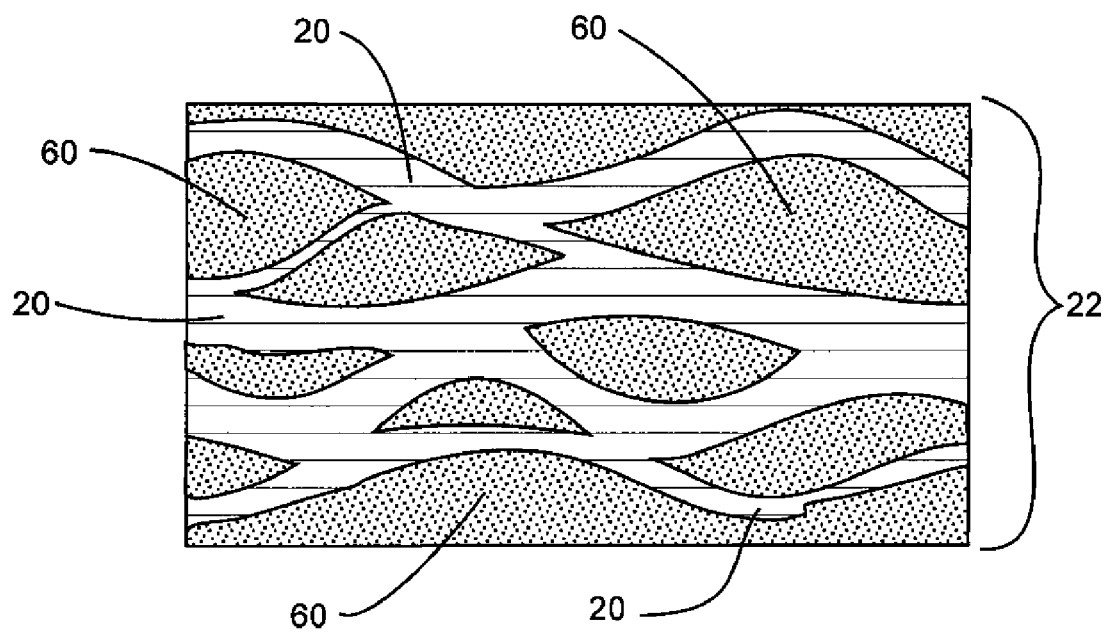
Figure 3C:
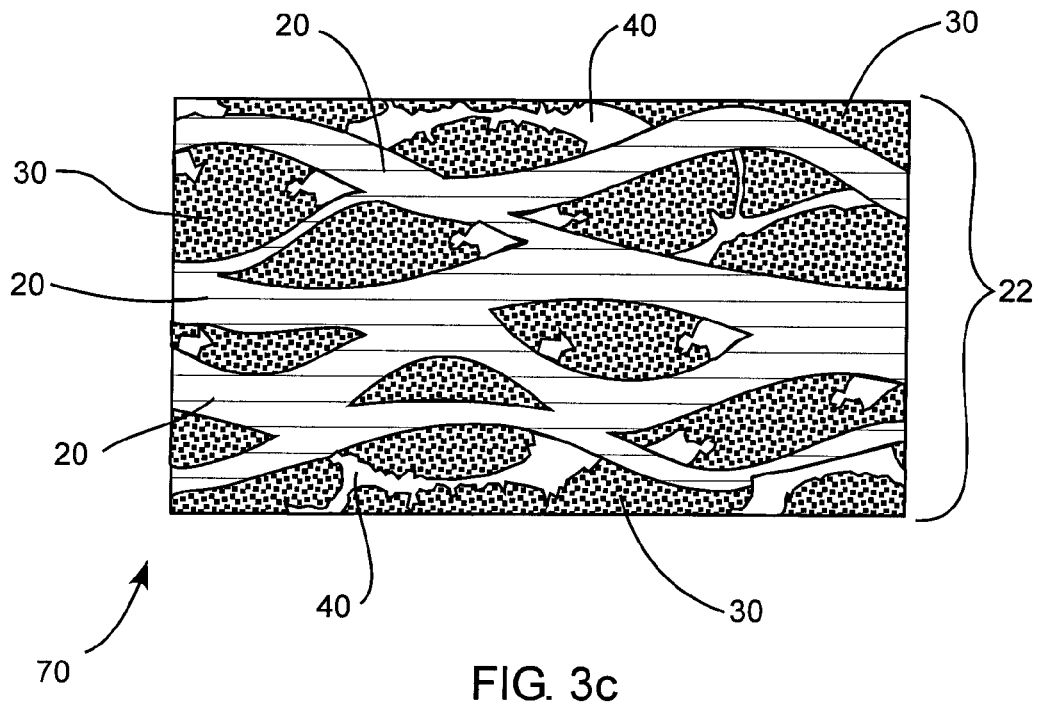
Figure 3D:
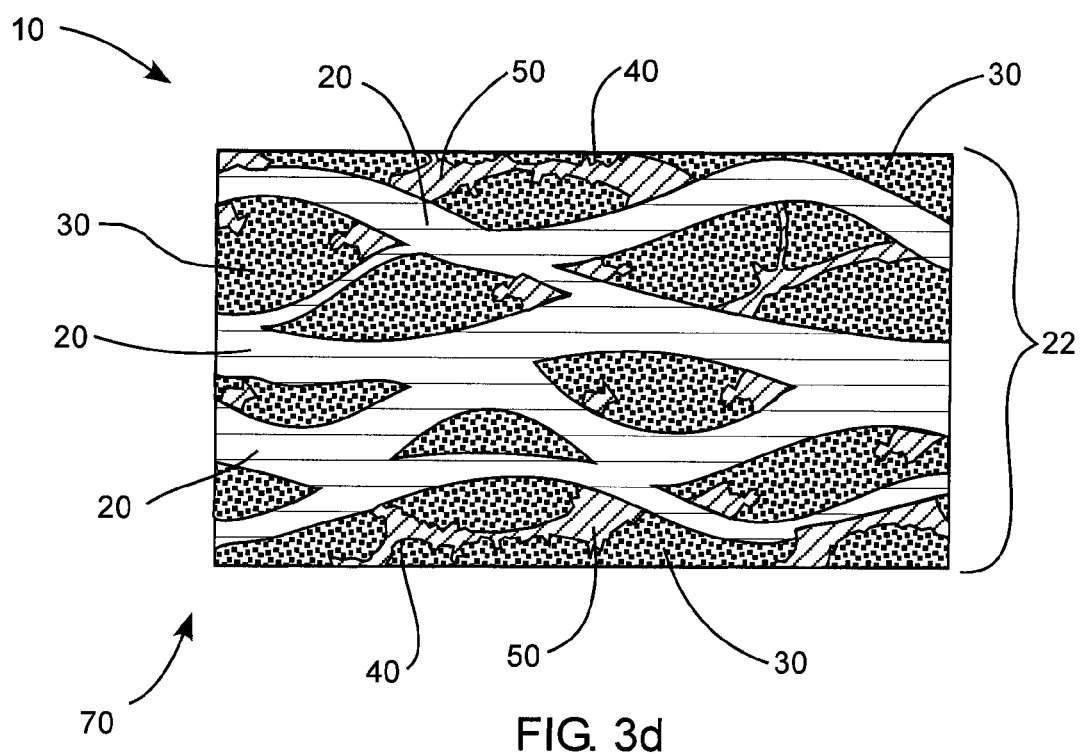

As illustrated in FIGS. 3a-3d, the present invention also provides for a method for forming a thermally conductive, heat dissipative composite structure including forming a carbon fiber lay up from a pitch-based carbon fiber having a thermal conductivity greater than 20 W/mK, as shown in FIG. 3a. A pyrolizable resin 60 can be impregnated into the carbon fiber lay-up, as shown in FIG. 3b. The pyrolizable resin impregnated carbon fiber lay-up can be heated to greater than approximately 1800° F. to pyrolize the resin into graphitic carbon and to form a carbon graphitic-carbon laminate structure, as shown in FIG. 3c. A structural resin can be infused into the carbon graphitic-carbon laminate structure to provide strength to the laminate structure, as shown in FIG. 3d. The structural resin can have a resin toughness greater than approximately 60 J/m$^2$. The structural resin infused laminate structure can be cured to form the heat dissipative composite material having a thermal conductivity of greater than approximately 10 W/mK.

Additionally, the step of heating the resin infused fiber lay-up can burn the pyrolizable resin to produce voids of approximately 35% by volume in the laminate structure. The step of infusing a structural resin substantially can fill the voids with the structural resin.

Moreover, the carbon fiber lay up can be formed in the size and shape of an enclosure for an electronic device, such as a personal computer, navigational and communication equipment for an airplane, and the like.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth herein.

What is claimed:

1. A heat dissipative composite material, comprising:
a) a carbon fiber lay-up including a thermally conductive carbon fiber forming a substantially continuous thermally conductive path along the carbon fiber layup;
b) a pyrolizable resin impregnated into the thermally conductive carbon fiber and pyrolized therein to a graphitic carbon state to form a graphitic carbon laminate structure with the carbon fiber; and
c) a structural resin infused into subsequent voids in the graphitic carbon laminate structure formed by pyrolization of the pyrolizable resin, the structural resin being cured therein to provide strength to the graphitic carbon laminate structure.

2. A composite material in accordance with claim 1, wherein the structural resin has a resin toughness greater than approximately 60 J/m$^2$.

3. A composite material in accordance with claim 1, wherein the thermally conductive carbon fiber has a thermal conductivity of greater than approximately 20 W/mK.

4. A composite material in accordance with claim 1, wherein the graphitic carbon laminate structure has a thermal conductivity of greater than approximately 10 W/mK.

5. A composite material in accordance with claim 1, wherein the carbon fiber lay-up further includes a fiber lay-up selected from the group consisting of fiber windings, fiber mats, chopped fibers, fiber plies, and combinations thereof.

6. A composite material in accordance with claim 1, wherein the carbon fiber lay-up includes a thermally conductive fiber selected from the group consisting of a pitch based carbon fiber, a pitch based graphite fiber, and combinations thereof.

7. A composite material in accordance with claim 1, wherein the pyrolizable resin is selected from the group consisting of a phenolic resin, a phenol formaldehyde resin, phenol-acetaldehyde, phenol-furfural, M-cresolformaldehyde, resorcinal-formaldehyde, melamine-formaldehyde, and combinations thereof.

8. A composite material in accordance with claim 1, wherein the pyrolizable resin is selected from the group consisting of a cyanate ester, a bisphenol cyanate ester, a novalac cyanate ester, and combinations thereof.

9. A composite material in accordance with claim 1, wherein the structural resin is selected from the group consisting of a structural epoxy, an epoxy novalac, a polycarbonate resin, a polycarbonate-polyester blend resin, a polyester resin, a glycidyl ether epoxy, a diglycidyl ether epoxy, a tridiglycidyl ether epoxy, a diglycerol, mannitol, a silicone polymer resin, a melamine resin, a heterocyclic resin, a polyamide resin, and combinations thereof.

10. A composite material in accordance with claim 1, wherein the structural resin is selected from the group consisting of a thermoplastic resin, an olefin resin, a cyclic olefin, a dicyclopentadienes (DCPD), and combinations thereof.

11. A composite material in accordance with claim 1, wherein the pyrolizable resin is pyrolized at a temperature greater than approximately 1800° F. to form the subsequent voids in the graphitic carbon laminate structure.

12. A composite material in accordance with claim 1, wherein the voids or structural resin comprise approximately 35% of the laminate structure by volume.

13. A composite material in accordance with claim 1, wherein the structural resin does not substantially contribute to thermal ablation.

14. A composite material in accordance with claim 13, wherein the structural resin is un-pyrolized.

15. A composite material in accordance with claim 1, wherein the material is sized and shaped to form an enclosure for an electronic device.

16. A composite material in accordance with claim 1, wherein the structural resin is un-pyrolized.

17. A heat dissipative composite material, comprising:
a) a carbon fiber lay-up formed from a pitch based carbon fiber having a thermal conductivity greater than approximately 20 W/mK;
b) a pyrolizable resin impregnated into the carbon fiber and pyrolized therein to a graphitic carbon state to form a carbon graphitic-carbon laminate structure with the carbon fiber; and
c) a structural resin infused into the laminate structure and cured therein to provide strength to the laminate structure and forming a resin infused carbon-graphitic-carbon matrix having a thermal conductivity greater than approximately 10 W/mK.

18. A composite material in accordance with claim 17, wherein the structural resin has a resin toughness greater than approximately 60 J/m$^2$.

19. A composite material in accordance with claim 17, wherein the pyrolizable resin is selected from the group consisting of a phenolic resin, a phenol formaldehyde resin, phenol-acetaldehyde, phenol-furfural, M-cresolformaldehyde, resorcinal-formaldehyde, melamine-formaldehyde, cyanate esther, and combinations thereof.

20. A composite material in accordance with claim 17, wherein the pyrolizable resin is selected from the group consisting of a cyanate ester, a bisphenol cyanate ester, a novalac cyanate ester, and combinations thereof.

21. A composite material in accordance with claim 17, wherein the structural resin is selected from the group consisting of a structural epoxy, an epoxy novalac, a polycarbonate resin, a polycarbonate-polyester blend resin, a polyester resin, a glycidyl ether epoxy, a diglycidyl ether epoxy, a tridiglycidyl ether epoxy, a diglycerol, mannitol, a silicone polymer resin, a melamine resin, a heterocyclic resin, a polyamide resin, and combinations thereof.

22. A composite material in accordance with claim 17, wherein the structural resin is selected from the group consisting of a thermoplastic resin, an olefin resin, a cyclic olefin, a dicyclopentadienes, and combinations thereof.

23. A composite material in accordance with claim 17, wherein the pyrolizable resin is pyrolized at a temperature greater than approximately 1800° F. to form the subsequent voids in the graphitic carbon laminate structure.

24. A heat dissipative composite article, comprising:
a) a pyrolized carbon fiber and in-situ graphitic-carbon laminate structure having a substantially continuous thermally conductive path along the laminate structure, the carbon fiber having a thermal conductivity of greater than approximately 20 W/mK;
b) a structural resin infused into the laminate structure and cured therein to provide strength to the laminate structure and forming a resin infused carbon-graphitic-carbon matrix, the structural resin having a resin toughness greater than approximately 60 J/m$^2$; and
c) the structural resin infused carbon-graphitic-carbon matrix providing a thermal conductivity of greater than approximately 10 W/mK through the composite article.

25. A composite material in accordance with claim 24, wherein the pyrolizable resin is selected from the group consisting of a phenolic resin, a phenol formaldehyde resin, phenol-acetaldehyde, phenol-furfural, M-cresolformaldehyde, resorcinal-formaldehyde, melamine-formaldehyde, cyanate esther, and combinations thereof.

26. A composite material in accordance with claim 24, wherein the pyrolizable resin is selected from the group consisting of a cyanate ester, a bisphenol cyanate ester, a novalac cyanate ester, and combinations thereof.

27. A composite material in accordance with claim 24, wherein the structural resin is selected from the group consisting of a structural epoxy, an epoxy novalac, a polycarbonate resin, a polycarbonate-polyester blend resin, a polyester resin, a glycidyl ether epoxy, a diglycidyl ether epoxy, a tridiglycidyl ether epoxy, a diglycerol, mannitol, a silicone polymer resin, a melamine resin, a heterocyclic resin, a polyamide resin, and combinations thereof.

28. A composite material in accordance with claim 24, wherein the structural resin is selected from the group consisting of a thermoplastic resin, an olefin resin, a cyclic olefin, a dicyclopentadienes, and combinations thereof.

29. A composite material in accordance with claim 24, wherein the pyrolizable resin is pyrolized at a temperature greater than approximately 1800° F. to form the subsequent voids in the graphitic carbon laminate structure.

30. A composite material in accordance with claim 24, wherein the article is an electronic device enclosure.

31. A composite material in accordance with claim 24, wherein the structural resin is un-pyrolized.

32. A heat dissipative composite material, comprising:
a) a carbon fiber lay-up including a thermally conductive carbon fiber forming a substantially continuous thermally conductive path along the carbon fiber layup;
b) a pyrolizable resin impregnated into the thermally conductive carbon fiber and pyrolized therein to a graphitic carbon state to form a graphitic carbon laminate structure with the carbon fiber; and
c) an un-pyrolized, structural resin infused into subsequent voids in the graphitic carbon laminate structure formed by pyrolization of the pyrolizable resin, the structural resin being cured without pyrolization therein to provide strength to the graphitic carbon laminate structure.

* * * * *